United States Patent [19]

Shanley

[11] 4,110,566

[45] Aug. 29, 1978

[54] SWITCHING NETWORK CONTROL ARRANGEMENT

[75] Inventor: James Joseph Shanley, Middletown, N.J.

[73] Assignee: Bell Telephone Laboratories, Incorporated, Murray Hill, N.J.

[21] Appl. No.: 846,162

[22] Filed: Oct. 27, 1977

[51] Int. Cl.² .................. H04Q 3/50; H03K 17/72
[52] U.S. Cl. .......................... 179/18 GF; 307/252 J
[58] Field of Search ............... 307/252 J, 252 K, 299; 179/18 GF, 18 GE, 18 AB; 340/166 R

[56] References Cited

U.S. PATENT DOCUMENTS

| | | | |
|---|---|---|---|
| 3,772,530 | 11/1973 | Sinclair | 307/252 J |
| 3,819,867 | 6/1974 | McCarthy et al. | 179/18 GF |
| 4,061,884 | 12/1977 | Adrian | 179/18 GF |

Primary Examiner—Thomas A. Robinson

Attorney, Agent, or Firm—James M. Graziano

[57] ABSTRACT

A thyristor switching network is disclosed in which the switching network control provides both crosspoint audit and centralized control capabilities. The switching network control circuit contains three signal generators each of which generates a particular control signal when enabled. A distribution circuit is also provided to connect each of the signal generators to a corresponding terminal of a selected thyristor crosspoint element. In this manner, the signal generators directly control the voltage appearing at any terminal of any crosspoint element and can be used to turn on, turn off, or audit the busy/idle status of any selected thyristor crosspoint element. Also, the thyristor crosspoints are switched on in the zero voltage mode and the dV/dt across the selected thyristor crosspoint element is controlled by the signal generators to eliminate false firing of the thyristor crosspoints.

11 Claims, 5 Drawing Figures

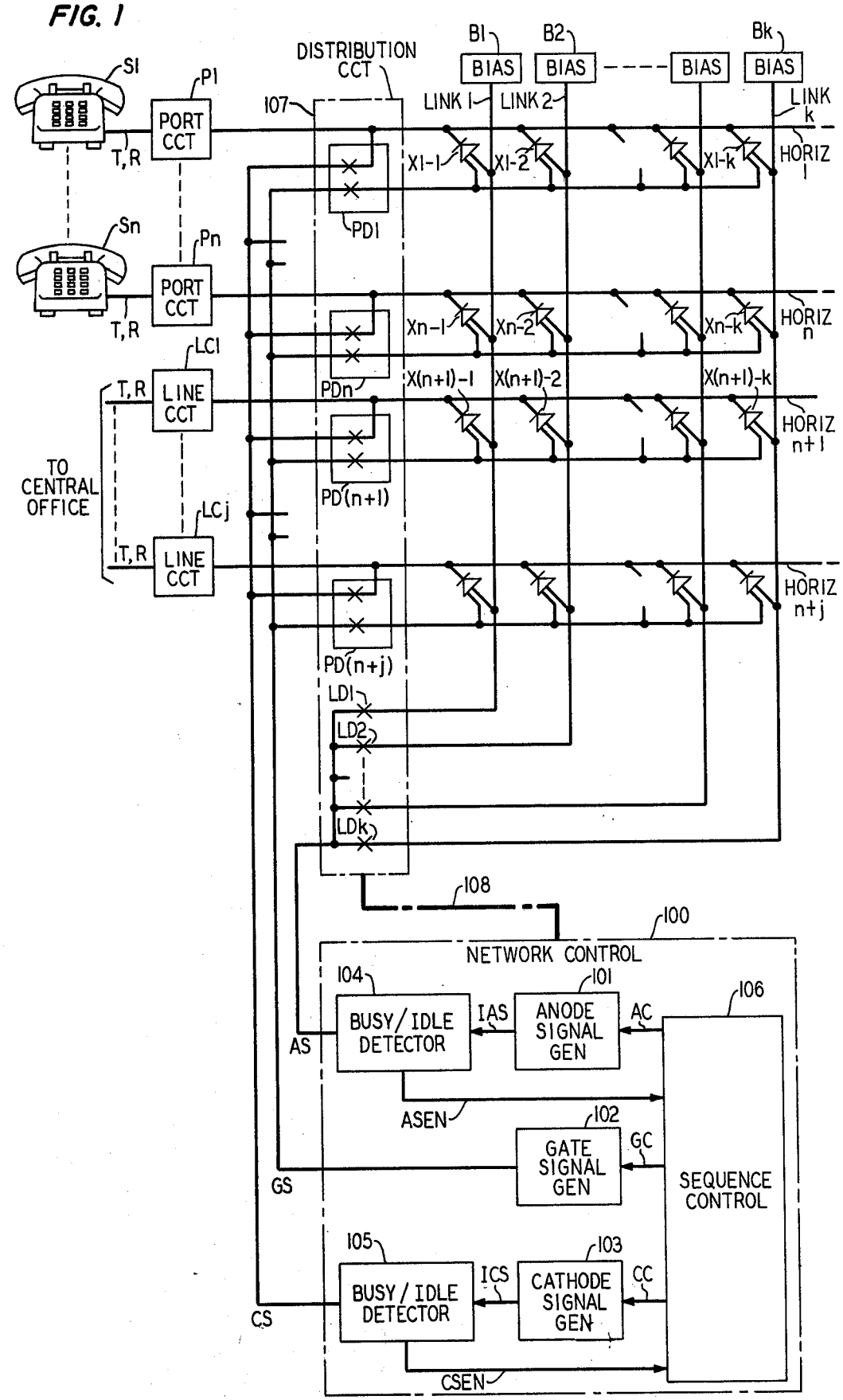

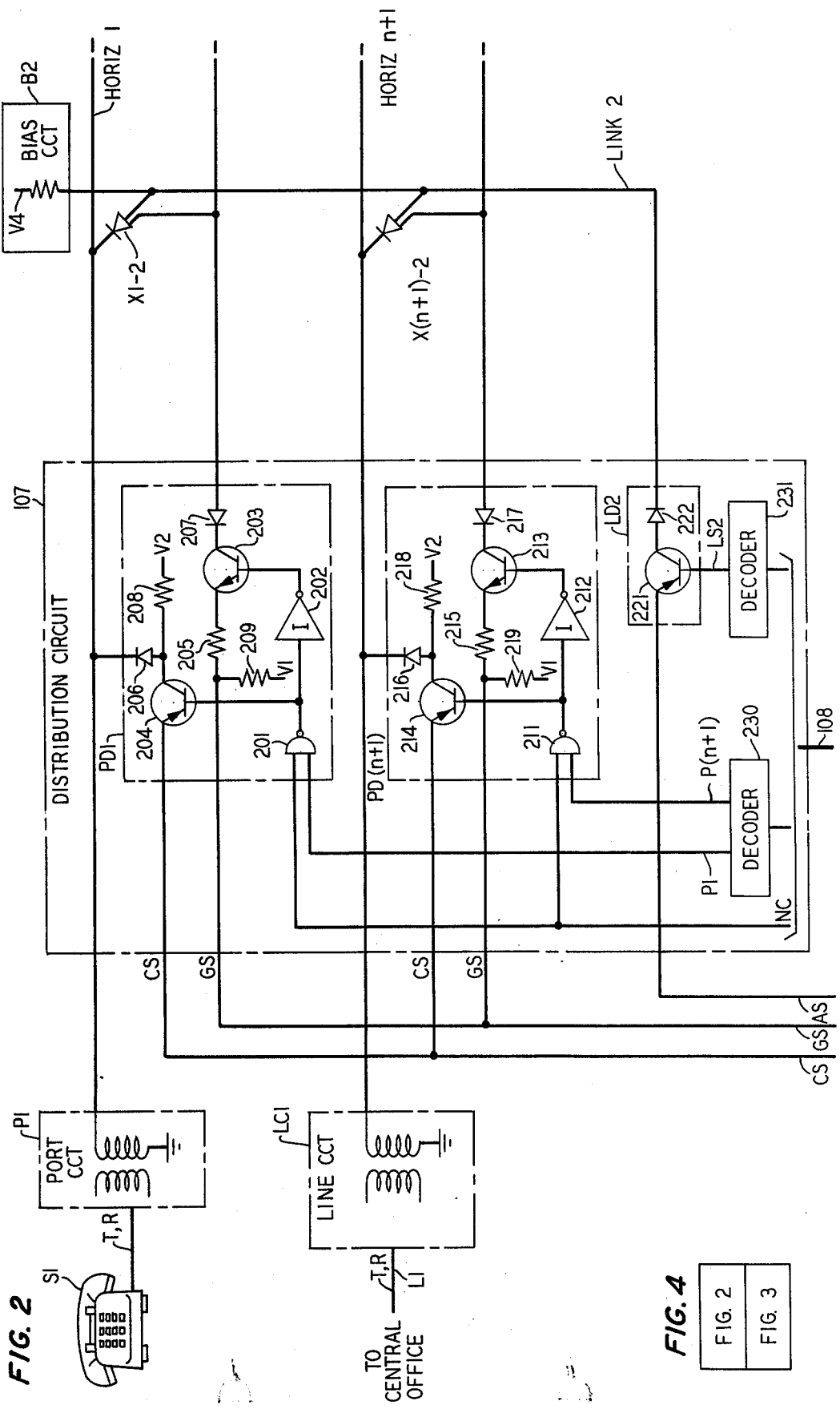

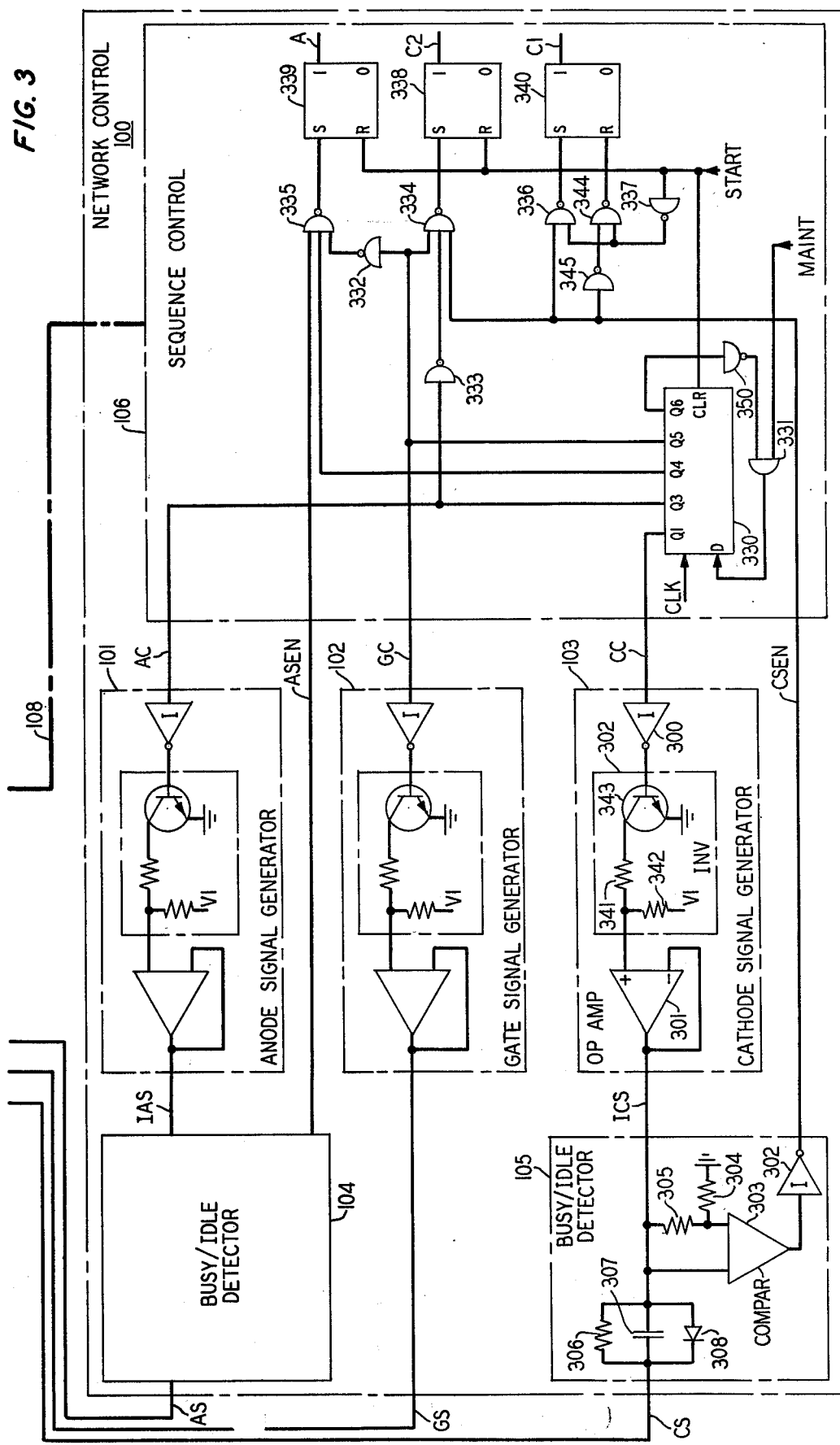

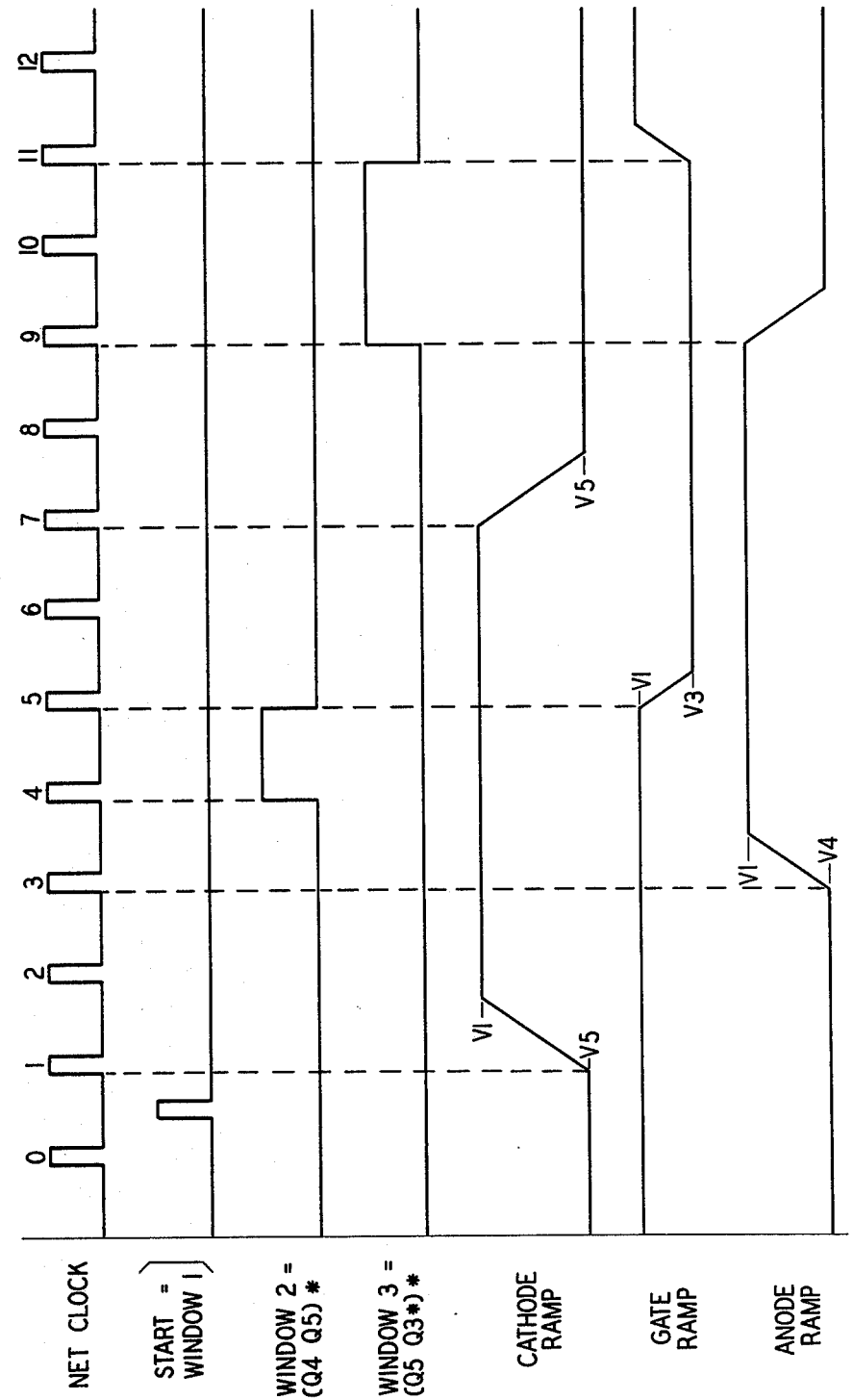

SWITCHING NETWORK CONTROL ARRANGEMENT

FIELD OF THE INVENTION

This invention relates to semiconductor switching networks and in particular to a network control arrangement which provides centralized control and crosspoint busy/idle status determination capability for a thyristor switching network.

DESCRIPTION OF PRIOR ART

Numerous semiconductor switching network crosspoint arrangements are found in business communication systems. The crosspoint elements employed in these prior art semiconductor switching networks are either PNPN devices, bipolar transistors, diodes, SCR's or field effect transistors. However, each of these named devices has serious disadvantages when used as a crosspoint element. Thyristor crosspoints, whether NPNP or PNPN devices, provide low crosspoint on resistance, can carry large currents, and can also withstand high line voltages, but thyristor devices are extremely noise sensitive. Noise signals can cause a forward biased thyristor crosspoint element to switch into the active state, with the forward bias maintaining the crosspoint in the active state. The extremely fast switching times of thyristor crosspoint elements and the high levels of dI/dt caused by this fact operation itself generates a significant amount of noise in a thyristor switching network. Thus, thyristor switching networks are noisy in their operation and are prone to false operation due to noise signals causing the thyristor crosspoint elements to erroneously latch on in the active state. These problems have in the past made thyristor crosspoint elements a poor choice for telephone switching networks due to the high degree of accuracy required in both establishing and controlling communication connections between telephone subscribers.

In view of the foregoing, an object of this invention is to provide a thyristor switching network that can establish communication connections with the reliability required for a telephone switching network.

It is a further object of this invention to provide a switching network control circuit that can operate, release and determine the busy/idle status of thryistor switching network crosspoint elements using common equipment.

SUMMARY OF THE INVENTION

In accordance with my invention, I provide a switching network control arrangement that operates, releases and determines the busy/idle status of thyristor switching network crosspoint elements with the accuracy and reliability required for telephone switching network applications.

The switching network control arrangement has direct access through a distribution circuit to all three terminals of each thyristor switching network crosspoint element. In this manner the voltage on any terminal of any selected thyristor crosspoint element in the switching network can be controlled by the switching network control. This is accomplished by employing a set of three signal generators, each generating a particular control signal, which signal is applied to the associated terminal fo the selected thyristor crosspoint element. Thus, the same signal generators can be used to operate, release or determine the busy/idle status of any selected thyristor crosspoint element in the switching network by simply applying the necessary control signals to the appropriate terminals of the selected thyristor crosspoint element. These signal generators have been selected such that all the aforementioned functions can be implemented simply by varying the combination of control signals applied by the signal generators to the selected thyristor crosspoint element.

Accordingly, it is a feature of the invention to provide facilities in a thyristor switching network for controlling the operation and release of the thyristor switching network crosspoint elements from a common location.

A further feature of the invention is the provision of facilities for determining the busy/idle status of any selected thyristor crosspoint element without disturbing the existing network connections.

A further feature of the invention is the provision of facilities for operating the thyristor crosspoint elements in the zero voltage mode.

A further feature of the invention is the provision of facilities for controlling the initial dV/dt across the operated thyristor crosspoint element.

BRIEF DESCRIPTION OF THE DRAWINGS

The operation of the present invention will be more fully apparent from the following description of the drawings in which:

FIG. 1 illustrates the invention in block diagram form;

FIGS. 2 and 3 show a preferred embodiment of the invention;

FIG. 4 shows a manner in which FIGS. 2 and 3 should be arranged; and

FIG. 5 shows the various voltage waveforms produced by the switching network control circuit.

GENERAL DESCRIPTION — FIG. 1

FIG. 1 shows the broader system aspects of my invention as embodied in a single stage thyristor switching network. The disclosed thyristor switching network is comprised of a plurality of thyristor devices connected in matrix form with the cathode terminal of each thyristor being connected to a horizontal of the switching network while the anode terminal of each thyristor is connected to a vertical of the switching network. Each horizontal of the switching network is connected to a station port circuit, a line circuit, or other such circuit while the switching network verticals function as links to interconnect two or more switching network horizontals. Thus, the disclosed thyristor switching network functions to establish a communication path between any two of the plurality of stations S*l*–S*n* connected to the left side of the thyristor switching network or between any one of stations S*l*–S*n* and any one of line circuits LC1–LC*j*, or any other such circuits, which may also be connected to the left side of the thyristor switching network by activating the associated thyristor crosspoint elements.

For example, if a thyristor crosspoint element such as X1-2 is operated, a dc path is established between switching network horizontal 1 and switching network vertical 2, thereby connecting station S1 and its associated station port circuit P1 to link 2. To further connect station S1 to a central office line circuit such as line circuit LC1, the thyristor cross-point element X($n$+1)−2 associated with both line circuit LC1 and link 2 must be operated to extend the existing communicatiion path (from station S1-to station port circuit P1-to link 2 via switching network horizontal 1) to line circuit LC1 via switching network horizontal (n+1). Thus, a plurality of switching network horizontals may be interconnected by operating the thyristor crosspoint elements associated with both those switching network horizontals and a selected one of links $l$ to $k$.

Control of the thyristor switching network crosspoint elements is accomplished by switching network control 100 which is comprised of three signal generators 101–103, two busy/idle status detectors 104, 105 and sequence control circuit 106. Each one of signal generators 101–103 is designed to produce a specific voltage waveform under the control of sequence control circuit 106. Thus, sequence control circuit 106 directs the timing of signal generators 101–103. Cathode signal generator 103, when activated by sequence control circuit 106, generates a cathode control signal which is applied to lead CS via busy/idle status detector 105. The cathode control signal is switched by distribution circuit 107 to the cathode of the selected crosspoint, which in this case is assumed to be thyristor crosspoint element X1-2. Thus, port selector PD1 of distribution circuit 107 switches the cathode control signal from lead CS to switching network horizontal 1. In similar fashion, gate signal generator 102 and anode signal generator 101 generate gate control signals and anode control signals respectively and these signals are applied to leads GS and AS respectively where they are switched by distribution circuit 107 to the gate and anode terminals respectively of selected thyristor crosspoint element X1-2. This is accomplished by port selector PD1 of distribution circuit 107 switching the gate control signal from lead GS to the gate terminals of all thyristor crosspoint elements associated with switching network horizontal 1. Similarly, link selector LD2 of distribution circuit 107 switches the anode control signal from lead AS to switching network link 2 thereby placing the anode control signal on the anode terminals of all thyristor crosspoint elements associated with link 2. The only thyristor crosspoint element in the thyristor switching network with all three terminals energized is therefore element X1-2. Thyristor crosspoint element X1-2 switches on in response to application of the three crosspoint control signals and is maintained in the active state by the hold current supplied by bias circuit B2. Operated crosspoint X1-2 therefore establishes a communication path between station S1 and link 2 by interconnecting switching network horizontal 1 and switching network vertical 2. Distribution circuit 107 operates under control of switching network control 100.

Thus, signal generators 101 to 103 have direct access through distribution circuit 107 to all three terminals of a selected thyristor crosspoint element. In this fashion signal generators 101 to 103 directly control the voltage appearing at all three terminals of any selected thyristor crosspoint element. Signal generators 101 to 103 can turn on the selected thyristor crosspoint element in the zero voltage mode and can also control the initial $dV/dt$ across the selected thyristor crosspoint element thereby controlling the current through the crosspoint. Additionally, the busy/idle status of a selected thyristor crosspoint element can be determined by busy/idle status detectors 104 and 105. This is accomplished by switching network control circuit 106 initiating a busy/idle status determination sequence wherein the cathode signal generator 103 generates the cathode control signal and busy/idle status detector 104 monitors the current drawn from cathode signal generator 103 by the selected switching network horizontal. Likewise, anode signal generator 101 generates the anode control signal and busy/idle status detector 104 monitors the current drawn from anode signal generator 101 by the selected switching network vertical. Thus, busy/idle status detector 105 determines the status of a selected station (switching network horizontal) while busy/idle status detector 104 determines the status of a selected link (switching network vertical). In this manner, the status of the particular crosspoint used to connect a selected switching network horizontal to a selected switching network vertical can be determined from the results of these two status determinations.

DETAILED DESCRIPTION — FIGS. 2 through 5

Drawing FIGS. 2 and 3 when arranged with respect to each other as shown in FIG. 4 illustrate how the various elements of my inventive embodiment cooperate to provide the network control features. The various equipments such as line circuits, station port circuits, etc. are oriented with respect to each other on FIGS. 2 and 3 in a manner analogous to that of FIG. 1. In FIG. 2, only a single station set S1, a single station port circuit P1, a single line circuit LC1 and a single link 2 are shown to simplify the drawing.

The invention can be further appreciated by describing the extension of a typical call from a central office line to a station set. Assume that an incoming central office call arrives on central office line L1 and is directed to telephone station set S1.

Line Circuit

Central office line L1 is terminated on line circuit LC1. Line circuits are a basic part of key telephone systems and are known in the art. Line circuits perform many functions, although for the purpose of this disclosure the interface function is the one of primary interest. Line circuit LC1 interfaces central office line L1 with switching network horizontal (n+1). This is accomplished by the use of a transformer and additional control and signalling circuitry. It is sufficient for the purpose of this disclosure to say that the transformer shown schematically in line circuit LC1 interfaces the two wire central office line L1 with the single wire switching network horizontal (n+1). The transformer couples the ac voice signals from central office line L1 to the switching network and also provides a sink for the dc bias current flowing on switching network horizontal (n+1).

Port Circuit

Telephone station set S1 is terminated on station port circuit P1. Station port circuits are a basic part of key telephone systems and are well known in the art. The station port circuit used in the present disclosure is of the type taught by D. J. Morgan et al., U.S. Pat. No. 3,991,279, issued Nov. 9, 1976. These station port circuits perform many functions, although for the purpose of this disclosure the interface function is the one of primary interest. Station port circuit P1 interfaces telephone station set S1 with switching network horizontal 1. This is accomplished by the use of a transformer and additional control and signalling circuitry. It is sufficient for the purpose of this disclosure to say that the transformer shown schematically in station port circuit P1 interfaces the two wire telephone station set S1 with the single wire switching network horizontal 1. The transformer couples the ac voice signals from telephone station set S1 to the switching network and also provides a sink for the dc bias current flowing on switching network horizontal 1.

Incoming Call

Returning to the call in progress, line circuit LC1 detects the presence of ringing on central office line L1 in a manner well known in the art and provides an incoming call indication to the common control, not shown, of the business communication system. In well known fashion, the common control of the business communication system responds to the incoming call indication, and the destination of this incoming call is determined to be station S1. A detailed description of this well known process is unnecessary for the understanding of this invention so it will be assumed that network control 1000 is supplied with information sufficient to identify the two parties to be interconnected, to wit, line circuit LC1 and telephone station set S1. This information comprises digitally coded descriptions of the two switching network horizontals to be interconnected. The first portion of this network connection to be implemented is the connection of line circuit LC1 to an idle link, in this case assumed to be link 2. Thus, network control 100 must activate the thyristor crosspoint element associated with both line circuit LC1 and link 2. This is accomplished by network control 100 providing the network connection information to distribution circuit 107 via cable 108. This coded network control information is input by network control 100 into decoders 230 and 231 in distribution circuit 107 where the network control information is converted to a selection signal which is then applied to the appropriate port and link selection leads. In the instant case, decoder 230 converts the network control information from cable 108 into a selection signal applied to lead P $(n+1)$ thereby enabling gate 211 of port selection circuit PD$(n+1)$. Thus, network horizontal $(n+1)$ has been selected and port selection circuit PD$(n+1)$ is enabled as the initial stage of establishing the network connection. Concurrent with the operation of decoder 230, decoder 231 converts the network control information from cable 108 into a selection signal which is applied to lead LS2 thereby enabling transistor 221 to pass whatever signal appears on lead AS to link 2 via diode 222. Thus, network vertical 2 (link 2) has been selected and transistor 221 is enabled to pass the network activation signals to link 2.

Sequence Control

Network control 100 also contains well known control and clock circuits (not shown) which activate sequence control 106 thereby enabling it to generate the network activation signals. This is accomplished by network control 100 placing a pulse on the START lead to sequence control 106, thereby resetting flip-flops 338, 339, 340 and shift register 330. The network control clock circuit continually applies periodic clock pulses on lead CLOCK which pulses function to operate 8-bit shift register 330. Data input D of shift register 330 is high because the output of AND gate 331 is high. Thus, with every clock pulse that appears on lead CLOCK, another high signal or 1 is shifted into shift register 330, and all previous binary bits stored in shift register 330 are shifted one bit to the right. Each of shift register 330 outputs Q1-Q8 indicate the binary bit stored in that location. Thus, clock signal CLOCK will cause a string of 1's to be shifted into shift registers 330 as long as the signal on shift register data input D is high. However, the input of AND gate 331 is connected through inverter 350 to the Q6 output of shift register 330. When six 1's have been shifted into shift register 330, the Q6 output will go high, causing gate 350 to turn on, turning off gate 331, placing a low signal on the data input terminal D of shift register 330. Thus, the combination of gates 331, 350 and shift register 330 provides a "string generator" wherein the clock signals on lead CLOCK cause a string of six 1's to be shifted into shift register 330, followed by a string of six 0's, etc. Thus, each one of shift register outputs Q1-Q8 will be high for six clock pulses followed by being maintained low for six clock pulses.

Network Control Signal Generators

Selected outputs of shift register 330 are used to activate anode signal generator 101, gate signal generator 102 and cathode signal generator 103. Thus, the Q1 output of shift register is connected to lead CC to control the operation of cathode signal generator 103. Cathode signal generator is comprised of inverters 300, 302 and operational amplifier 301. A high signal on output Q1 of shift register 330 is applied to lead CC, doubly inverted by inverters 300 and 302 and thence applied to the positive input terminal of operational amplifier 301. Operational amplifier 301 is connected in the unity gain configuration and responds to the high signal appearing on the output of inverter 302 by switching the operational amplifier output to duplicate the voltage appearing at its positive input terminal. Inverter 302 is comprised of resistors 341, 342, transistor 343 and has a high output signal level of V1 volts and a low output signal level determined by the voltage divider effect of resistors 341, 342 in conjunction with supply voltage V1. Thus, the range of output voltages supplied by operational amplifier 301 is determined by the selection of voltage V1 and resistors 341, 342 of inverter 302. Operational amplifier 301 does not instantaneously change output voltages in response to the change in voltage appearing at the operational amplifier positive input terminal but, instead, switches levels at a fixed rate determined by the inherent operational amplifier characteristics. This rate of responsiveness is termed the "slew rate" and causes the operational amplifier to generate a ramp output signal in response to a step input signal. Thus, the sharp, fast logic signals generated by sequence control 106 and inverters 300, 302 are smoothed by operational amplifier 301 and applied to lead CS via diode 308, resistor 306, capacitor 307. This signal on lead CS remains high until the Q1 output of shift register goes low and this signal propagates through inverters 300, 302 to operational amplifier 301 which then ramps the signal on lead CS down to the low level set by inverter 302. In similar fashion, gate signal generator 102 and anode signal generator 101 are controlled by the Q5 and Q3 outputs respectively of shift register 330.

The control signals generated by signal generators 101-103 and applied to leads AS, GS, CS respectively are then switched by distribution circuit 107 to the selected crosspoint X$(n+1)-2$. This is accomplished by network control 100 applying a high signal, coincident with the pulse appearing on lead START, on lead NC of cable 108 thereby turning on already enabled gate 211 of port selection circuit PD$(n+1)$. Gate 211 on turns off inverter 212 and also turns on transistor 214, switching the cathode control signal from lead CS to switching network horizontal $(n+1)$ via diode 216. The cathode control signal is thereby applied to the cathode terminals of all the thyristor crosspoint elements connected to switching network horizontal $(n+1)$ including the crosspoint element of interest, $X(n+1)-2$. Similarly, inverter 212 turns on transistor 213, switching the gate control signal from lead GS to the gate terminals of all the thyristor crosspoint elements connected to switching network horizontal $(n+1)$ including the crosspoint element of interest, $X(n+1)-2$. As previously mentioned, the network control information appearing on cable 108 is converted by decoder 231 to an enable signal on lead LS2, which turns on transistor 221, switching the anode control signal from lead As to switching network vertical 2, also referred to as link 2. The anode control signal is thereby applied to the anode terminals of all the thyristor crosspoint elements connected to switching network vertical 2, including the crosspoint element of interest $X(n+1)-2$. Thus, the only thyristor crosspoint element in the switching network that has the cathode, anode, and gate control signals all concurrently applied to its cathode, anode and gate terminals respectively is cross-point element $X(n+1)-2$. Therefore, thyristor crosspoint element $X(n+1)-2$ switches on, and is maintained in the active state by a hold current flowing from bias circuit B2 through crosspoint element $X(n+1)-2$ to line circuit LC1 and thence through the transformer in line circuit LC1 to circuit ground.

Voltage Waveforms — FIG. 5

The timing and waveshapes of the signals appearing on leads CS, GS and As are shown in FIG. 5 of the drawing. The first line, labeled CLOCK is the network clock signal which is the signal appearing on lead CLOCK to operate shift register 330 of sequence control 106. A series of 13 pulses on lead CLOCK are shown in FIG. 5 to demonstrate the timing of the network connection sequence. Line 2, labeled START, indicates the appearance of the pulse on lead START which signal resets sequence control circuit 106 and initiates the network connection sequence. Lines 5, 6, 7 illustrate the voltage waveforms appearing on leads CS, GS, AS respectively. Line 5 shows the cathode control signal which initially is voltage V2, which voltage is the idle state voltage supplied by distribution circuit 107 to switching network horizontal $(n+1)$ via resistor 218 in port selection circuit $PD(n+1)$. Cathode signal generator 103 is designed, as previously mentioned, to switch between two voltage levels. The low level has been selected to be voltage V5, slightly higher than the idle state voltage of the cathode terminal of the selected crosspoint element. Cathode signal generator 103, when activated by the Q1 output of shift register 330 at pulse 1 of the network clock, gradually switches to voltage level V1 at a rate determined by the slew rate of operational amplifier 301. This voltage level of V1 will be maintained by cathode signal generator 103 until shift register 330 switches output Q1 which occurs at pulse 7 of the network clock (as previously explained). At that time, operational amplifier 301 will gradually switch from voltage V1 to voltage V5 at a rate determined by the slew rate of operational amplifier 301. In similar fashion, shift register 330 causes gate signal generator 102 to switch between voltages V3 and V1 and anode signal generator 101 to switch between voltages V4 and V1 at the predetermined times as previously explained.

Bias circuit B2 provides link 2 with an idle state voltage of V4 and port selection circuit $PD(n+1)$ provides the gate terminals of all the crosspoint elements associated with switching network horizontal $(n+1)$ with an idle state voltage of V1. Thus, signal generators 101-103 have initial and final voltages that match the idle state voltages of the anode, cathode and gate terminals of the thyristor crosspoint elements. Therefore, when distribution circuit 107 switches the outputs of signal generators 101-103 to a selected thyristor crosspoint element, there is no initial voltage change and therefore no noise is generated by distribution circuit 107 switching leads AS, GS, CS to the associated terminals of the selected thyristor crosspoint element. As can be seen from the voltage waveforms on FIG. 5, the gate electrode of the selected crosspoint element is not activated until the anode and cathode terminals are both at the same voltage level of V1. Then, the gate terminal voltage is slowly switched to voltage V3 to bias the crosspoint on and the cathode terminal voltage is subsequently slowly switched to voltage V5. This sequence of voltages turns on the selected crosspoint element in the zero voltage mode, supplies a gradually increasing gate bias signal to switch the crosspoint on, then gradually increases the voltage across the crosspoint element, Busy/idle gradually increasing current switched through the crosspoint element. Thus, signal generators 101-103 directly control every aspect of the thyristor crosspoint element operation to prevent erroneous crosspoint operation and to minimize noise generation in the thyristor switching network.

busy/idle Status Determination

Busy/idle detectors 104 and 105 function to determine the status of a selected crosspoint. This is accomplished by monitoring the voltage on control leads AS and CS. In particular, busy/idle detector 105 is equipped with resistor 306, capacitor 307, diode 308 which are connected in parallel to indicate the current flow from signal generator 103 to lead CS. If the selected switching network horizontal is busy, no current will flow on lead CS since the busy state voltage of the selected switching network horizontal is greater than the idle state voltage of signal generator 103. If the selected switching network horizontal $(n+1)$ were idle, current would flow in lead CS through transistor 214, diode 216 and thence to circuit ground through the transformer of line circuit LC1 since the idle state voltage of the selected switching network horizontal is slightly lower than the idle state voltage of signal generator 103. This voltage difference is detected by the comparator composed of resistors 304, 305 and comparator 303 since this current flow would cause a voltage drop across resistor 306 which voltage drop would be detected by comparator 303. The logic output of comparator 303 is inverted by inverter 302 and supplied to sequence control 106 where this indication is stored. Sequence control 106 is equipped with three busy/idle status latches comprised of flip-flops 338–340. These latches are set at various times in the call to record the busy/idle status of the selected crosspoint and this timing relationship is demonstrated in FIG. 5. Line 2 of FIG. 5 shows "window 1" or the first latch operation while lines 3 and 4 show "windows 2 and 3" or the second and third latch operations. The start pulse on lead START resets flip-flops 338–340. When the start pulse is removed, gate 337 enables gate 336 which switches the busy/idle status information from busy/i- dle detector 105 into flip-flop 340 thereby indicating the status of the selected switching network horizontal prior to the network connection being established. Similarly, gate 335 is enabled at time Q4Q5* and switches the busy/idle status information from busy/idle detector 104 into flip-flop 339 thereby indicating the link status just prior to the network connection being established. Gate 334 is enabled at time Q5Q3* and switches the busy/idle status information from busy/idle detector 105 into flip-flop 338 thereby indicating the status of switching network horizontal (n+1) just after the network connection is established. Thus, the busy/idle status of both the selected switching network horizontal and vertical are determined and provided to network control 100 by sequence control 106 via leads C1, A, C2.

Call Completion

Returning to the call in progress, a communication path has been established from central office line L1 through line circuit LC1 to switching network horizontal (n+1) and thence through operated thyristor crosspoint element X(n+1)-2 to link 2. The called station S1 must now be connected to this communication path. This is accomplished by network control 100 generating another start pulse and applying this signal to lead START to reset sequence control 106. Network control information is provided on cable 108 to distribution circuit 107 and the network connection sequence proceeds as previously described to now operate thyristor crosspoint element x1-2 thereby also connecting telephone station set S1, through station port circuit P1, to switching network horizontal 1 and thence through operated thyristor crosspoint element X1-2 to link 2.

Additional Operations

An existing call can be disconnected simply by initiating a call connect sequence and not supplying a link selection address to distribution circuit 107. Thus, signal generators 101-103 will sequence through the complete signal generation operation and the cathode and gate control signals will be applied to the selected crosspoint element. However, no link selection circuit will be activated and the anode control signal will be blocked from the anode terminal of the selected thyristor crosspoint element. Thus, the selected crosspoint element will have a voltage of V4 volts on its anode terminal and V1 volts on the cathode terminal, back biasing the thyristor crosspoint element, thereby switching it off.

A busy/idle status determination can be accomplished by initiating a network connect sequence as previously discussed. At the beginning of the network connect sequence the pulse on lead START resets flip-flops 338, 339, 340 and shift register 330. In addition, the high signal on lead NC connects leads CS, GS to the selected switching network horizontal thereby enabling busy/idle detector 105 to determine the busy/idle status of the selected switching network horizontal. As previously described, this busy/idle status information is stored in flip-flop 340, thereby indicating the status of the selected switching network horizontal just prior to a network connection being established. However, since this is an audit routine, the crosspoint control signals should not be applied to the selected crosspoint because this would establish a network connection. Therefore, network control 106 places a low signal on lead MAINT to turn on AND gate 331, thereby placing a low signal on the D input of shift register 330 and cancelling the remainder of the network connection sequence.

Conclusion

While a specific embodiment of the invention has been disclosed, variations in procedural and structural detail within the scope of the appended claims are possible, and are contemplated. There is no intention of limitation to what is contained in the abstract or in the exact disclosure as herein presented. The above-described arrangements are only illustrative of the application of the principles of the invention. Normally, other arrangements may be devised by those skilled in the art without departing from the spirit and scope of the invention.

What is claimed is:

1. In a telephone switching network comprising a plurality of thyristor crosspoint elements operation of each said thyristor crosspoint element has an anode, a cathode, and a gate terminal, a switching network control arrangement comprising:
   network control means for generating a first and a second control signal to activate a selected one of said thyristor crosspoint elements;
   signal control means responsive to said first control signal for generating crosspoint activation signals wherein said signal control means includes:
   anode signal generating means responsive to said first control signal for generating an anode activation signal,
   cathode signal generating means responsive to said first control signal for generating a cathode activation signal,
   gate signal generating means responsive to said first control signal for generating a gate activation signal; and
   distribution means responsive to said second control signal for switching said anode, cathode and gate activation signals to said selected thyristor crosspoint element.

2. The invention of claim 1 wherein said crosspoint activation signals turn on said selected thyristor crosspoint element in the zero voltage mode.

3. The invention of claim 1 wherein said anode and cathode activation signals supply power to said selected thyristor crosspoint element to turn on said selected thyristor crosspoint element.

4. The invention of claim 1 wherein said network control means additionally generates a third and a fourth control signal for deactivating a selected one of said thyristor crosspoint elements;
   wherein said signal control means is responsive to said third control signal for generating crosspoint deactivation signals;
   wherein said distribution means are responsive to said fourth control signal for switching said crosspoint deactivation signals to said selected thyristor crosspoint element; and
   wherein said crosspoint deactivation signals reverse bias said selected thyristor crosspoint element to turn off said selected thyristor crosspont element.

5. The invention of claim 4 wherein said network control means additionally generates a fifth and sixth control signal for auditing the status of a selected one of said thyristor crosspoint elements;
   wherein said signal control means is responsive to said fifth control signal for generating crosspoint audit signals;

wherein said distribution means are responsive to said sixth control signal for switching said crosspoint audit signals to said selected thyristor crosspoint element; and wherein said signal control means includes monitor means responsive to the load placed on said anode and cathode signal generating means by said selected thyristor crosspoint element for determining the busy/idle status of said selected thyristor crosspoint element.

6. A thyristor switching circuit for interconnecting a first and a second signal lead in response to a control signal comprising:

a thyristor device having anode, cathode and gate terminals wherein said anode terminal is connected to said first signal lead and said cathode terminal is connected to said second signal lead; and control means connected to said anode, cathode and gate terminals for controlling the operation of said thyristor device wherein said control means comprises:

anode signal generating means responsive to said control signal for generating an anode activation signal, cathode signal generating means responsive to said control signal for generating a cathode activation signal, gate signal generating means responsive to said control signal for generating a gate activation signal.

7. The invention of claim 6 wherein said anode signal generating means is responsive to said control signal for initiating said anode activation signal at the dc bias level present on said first signal lead.

8. The invention of claim 6 wherein said anode signal generating means is responsive to said control signal for terminating said anode activation signal at the dc bias level present on said first signal lead and said cathode signal generating means is responsive to said control signal for terminating said cathode activation signal at the dc bias level present on said second signal lead.

9. The invention of claim 6 wherein said anode and said cathode signal generating means raise the voltage on both said first and said second signal leads respectively to a predetermined activation voltage level and wherein said gate signal generating means biases said thyristor device on only when both said first and said second signal leads are at said activation voltage level.

10. The invention of claim 9 wherein said anode and said cathode signal generating means forward bias said thyristor device only after said gate signal generating means switches on said thyristor device.

11. The invention of claim 10 wherein said anode and said cathode signal generating means control the $dV/dt$ of said thyristor device when switched on by said gate signal generating means.